ABSTRACT OF THE DISCLOSURE

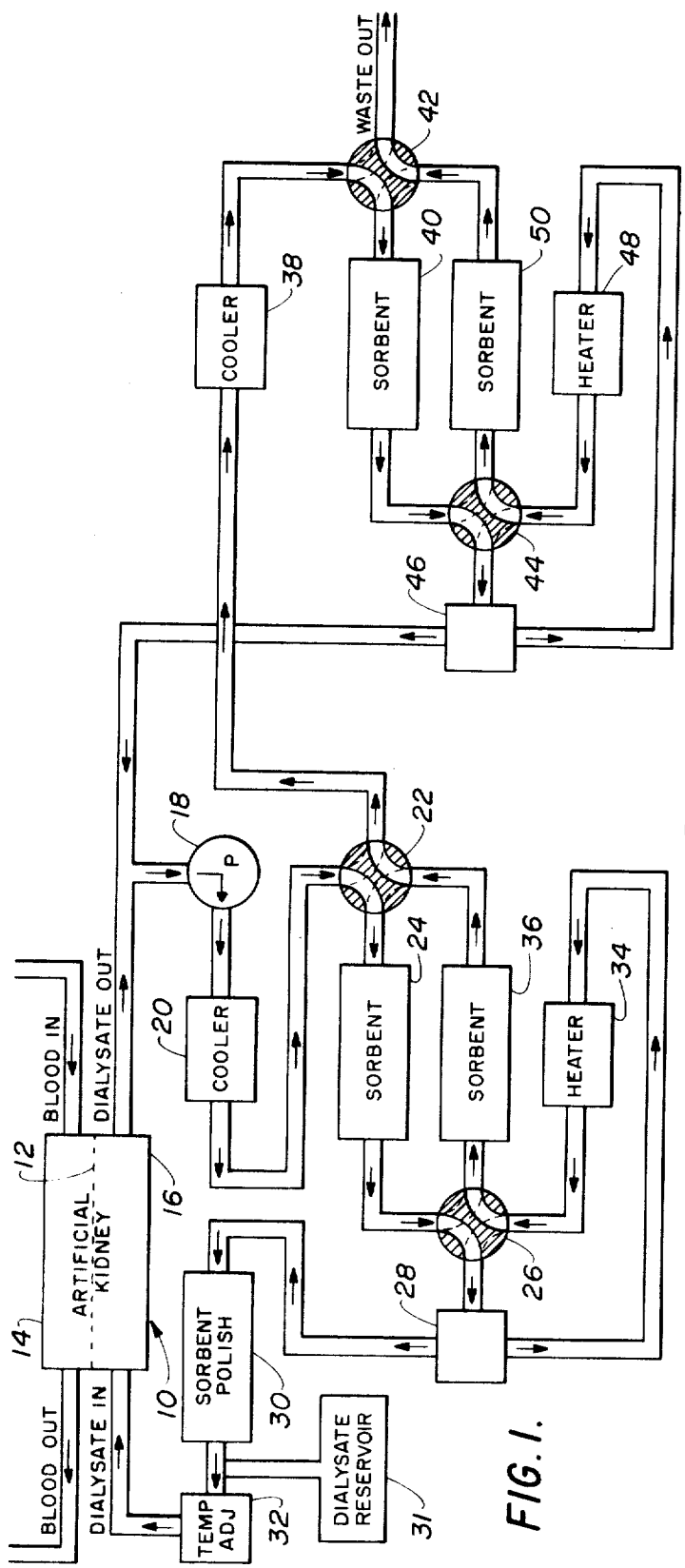
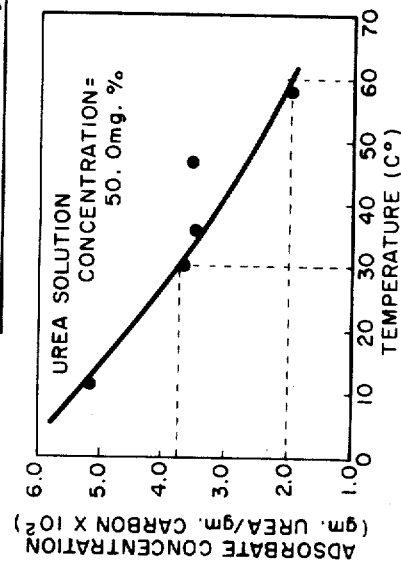
FIG.1.
FIG.2.
INVENTOR.
ALLAN M. JOHNSON
BY
R.E. Geangue
ATTORNEY 3,697,418
METHOD AND APPARATUS FOR REGENERATING THE DIALYZING FLUID FOR AN ARTIFICIAL KIDNEY
Allan M. Johnson, Reseda, Calif., assignor to CCI Aerospace Corporation, Van Nuys, Calif.
Filed Jan. 25, 1971, Ser. No. 109,234
Int. Cl. B01d 13/00
U.S. Cl. 210—22
22 Claims

The method and apparatus for removing the waste metabolites from the dialyzing fluid of an artificial kidney wherein the temperature of the dialyzing fluid is lowered prior to the fluid entering a first carbon sorbent chamber, the carbon absorbing the waste metabolites, a portion of the fluid leaving the first chamber being raised in temperature and moved into a second carbon sorbent chamber having a high percentage of adsorbed waste metabolites, the fluid after leaving the second sorbent chamber being lowered in temperature and caused to come into contact with a third sorbent chamber, a portion of the fluid after leaving the third sorbent chamber being returned to reenter the first sorbent chamber.

BACKGROUND OF THE INVENTION

The field of this invention relates to artificial kidneys and more particularly to a method and apparatus for regeneration of the dialyzing fluid employed within an artificial kidney which is used to remove waste metabolities from animal blood.

A sizable fraction of the people who die each year of kidney failure are free from other complications and might be restored to a fairly normal life if their kidney function could be provided artificially. At present, the artificial kidney has been developed sufficiently to permit long-term sustenance of life by periodic hemodialysis.

Basically, the artificial kidney is composed of a large, thin membrane which separates the blood from the dialyzing fluid. Normally, the dialyzing fluid is a solution similar in ionic composition to blood and made approximately isotonic by adding glucose. The blood may be maintained at a higher pressure than the dialyzing fluid, and water from the blood may be forced through the membrane by the pressure difference. Waste metabolites, such as urea, creatinine, and uric acid, are removed from the blood by diffusing through the membrane in response to the existing concentration gradients. Sufficient removal of the metabolic waste requires a concentration difference across the membrane to be held as high as possible for each molecule to be removed. Hence, concentration of these materials in the dialyzing fluid must be held low.

The problem of maintaining a low metabolic waste concentration in the dialyzing fluid has been traditionally approached in two ways. The first way is to discard the dialyzing fluid after going through the artificial kidney. The second way is to regenerate the dialyzing fluid after leaving the artificial kidney with the regenerated dialyzing fluid being again recycled through the kidney.

The normal person requiring the use of an artificial kidney must be treated several times a week. Normally, such treatments may take as long as ten hours at a time with between 50 and 100 gallons of dialyzing fluid being passed through the artificial kidney. Although the dialyzing fluid can be made relatively inexpensively, because of the large volume of the fluid employed in each treatment and the frequency of treatments, the cost becomes substantial if the fluid is discarded after a single use. Further, effort is recently being made toward the designing of a small compact artificial kidney unit which can be employed within the home. The large volume of dialyzing fluid that would be necessary if such were discarded after a single pass through the kidney would preclude the use of such a compact unit. Clearly, the only reasonable approach is to effect a regeneration of the dialyzing fluid. Progress can be made in reducing the size of the artificial kidney if the dialyzing fluid volume can be reduced without loss of mass transfer efficiency.

It is known in the past that certain inert solids are useful in removing the waste metabolites from the dialyzing fluid, the removal being accomplished by adsorption. This permits a recycle of a substantial amount of the dialyzing fluid without significant loss of mass transfer efficiency. It is difficult to select a suitable inert solid which has a high capacity for the waste metabolites. Activated carbon has a sufficiently high capacity for uric acid and creatinine, two waste metabolites which must be removed. However, inconveniently large amounts of activated carbon are required to remove urea which must be removed in substantial quantity.

The adsorption of urea by activated carbon is reversible, indicating that periodic regeneration can give an effective increase in capacity. Activated carbon adsorbs urea to an extent depending upon temperature. In other words, the lower the temperature, the greater the level of maximum adsorption characteristic, and the higher the temperature, the lower the adsorption characteristics of the carbon.

SUMMARY OF THE INVENTION

The method and apparatus of this invention relates to the extraction of waste metabolites, and primarily urea, from the dialyzing fluid of an artificial kidney. The dialyzing fluid, after removal from the artificial kidney, enters a first sorbent chamber at a lowered temperature. The first sorbent chamber then effects substantial removal of the urea from the dialyzing fluid. After the fluid leaves the first sorbent chamber, the fluid is divided with approximately one-third of the fluid volume being conducted into a second sorbent chamber. The fluid entering the second sorbent chamber is significantly raised in temperature. The activated carbon located in the second sorbent chamber is to have previously adsorbed a maximum or near maximum amount of urea at a much lower temperature. As a result, the urea located within the second sorbent chamber is transmitted from the activated carbon back into the dialyzing fluid passing through the second chamber, thus regenerating the carbon of the second chamber. A valve system is located between the first and second sorbent chambers to effect switching of such when the first sorbent chamber has adsorbed maximum or near maximum amount of urea and when the second sorbent chamber has given off the maximum amount or near maximum amount of urea. The primary portion of the dialyzing fluid leaving the first sorbent chamber is then conducted back to the inlet side of the artificial kidney. The portion of the dialyzing fluid leaving the second sorbent chamber is then significantly lowered in temperature and transmitted through a third sorbent chamber which effects removal of a substantial portion of the contained urea. The dialyzing fluid leaving the third sorbent chamber is divided with the major portion of the fluid being transmitted back to reenter the first sorbent chamber. It is to be noted that the concentration of urea leaving the third sorbent chamber should be approximately equal to or below the urea concentration of the fluid from the artificial kidney. The divided portion of the fluid from the third sorbent chamber is elevated in temperature and passed through a fourth sorbent chamber. Again, the fourth sorbent chamber is to contain activated carbon which has previously adsorbed a near maximum amount of urea. The activated carbon is to give up urea to the portion of the dialyzing fluid passing therethrough with that fluid being then disposed of exteriorly of the system. A valve arrangement is also associated between the third and fourth sorbent chambers so as to effect a switching of such for regeneration of the fourth chamber and maximum adsorption of the third chamber.

BRIEF DESCRIPTION OF THE DRAWING

FIG. 1 is a schematic block diagram of the (dialyzing fluid) dialysate regeneration system of this invention; and FIG. 2 is a chart depicting temperature dependence of urea adsorption of a typical activated carbon for a particular urea solution concentration.

DETAILED DESCRIPTION OF THE SHOWN EMBODIMENT

Referring particularly to the drawing, there is shown in FIG. 1 a conventional artificial kidney 10 in schematic form. The artificial kidney may take any of various forms and need not be described here in detail. However, the basic operation of the kidney is to employ the use of a membrane 12 to effect diffusion of the waste metabolites from the blood passing through the kidney within chamber 14 into the dialysate chamber 16. It is to be understood that appropriate conduits are connected from blood vessels of the animal to conduct blood from the animal into and out of the artificial kidney 10. It is also to be understood that appropriate conduits are to be employed to effect conductance of the dialysate into and out of kidney 10.

The dialyzing fluid is moved through the artificial kidney 10 by means of a pump 18. Pump 18 may take any of various conventional form such as a centrifugal pump or the like. The fluid is then conducted from the pump 18 into a heat transfer apparatus 20. The apparatus 20 is to effect removal of heat energy from the fluid thereby lowering the temperature of such. The cooler apparatus 20 may take any of numerous various forms such as an apparatus which operates similar to the conventional home refrigerator. It is believed to not be necessary to describe in detail the operation of the cooler 20.

The fluid, now at the lower temperature, is then conducted through a first valve 22 into a first sorbent chamber 24. The first sorbent chamber is to contain a packed bed of activated carbon. Although the use of such packed carbon beds is conventional and need not be described here in detail, it is to be understood that the carbon bed employed within this invention is to be composed of an amount of relatively grain-sized charcoal granules. It is also to be considered within the scope of this invention to employ the cooler apparatus 20 in combination with the sorbent chamber 24. If this combination is accomplished, the fluid flowing through the sorbent chamber 24 would be maintained at a constant value of lower temperature. The lower the temperature of the fluid passing through the chamber 24, the higher the absorption capacity of the charcoal.

The fluid is then conducted from the chamber 24 through a second valve 26 into a flow divider 28. The flow divider 28 is to permit selecting of a primary flow stream and a secondary flow stream. The primary flow stream is to be conducted through a polish sorbent chamber 30 to additionally remove more urea prior to the primary flow being conducted back into the artificial kidney 10. It is desired that the dialysate upon entering the kidney 10 be extremely close to the temperature of blood. For that purpose, a temperature adjuster 32 is to be employed in the flow path of the primary flow between the polish sorbent chamber 30 and the artifical kidney 10. The structure of the temperature adjuster is again conventional and may take any of various forms. The function of the adjuster 32 is to increase the temperature of the dialyzing fluid, if necessary, to the blood temperature or decrease the temperature of the fluid, if necessary. The normal function of the adjuster 32 will be to increase the temperature of the dialyzing fluid. Also, a dialysate reservoir 31 is provided to supply any dialysate deficiency which may occur so as to maintain the desired rate of flow of dialysate flowing through the system.

The secondary flow from the flow divider 28 is conducter through a heat transfer apparatus 34. The apparatus 34 functions opposite to apparatus 20 in that apparatus 34 supplies heat energy into the dialyzing fluid passing therethrough. Again, the apparatus 34 is deemed to be conventional and need not be described here in detail. It may be desirable to connect together the apparatuses 20 and 34 so that the heat energy removed within apparatus 20 is then to be conducted back into the dialyzing fluid through apparatus 34. The dialyzing fluid leaving apparatus 34 is conducted through the second valve 26 into the second sorbent chamber 36. A second sorbent chamber 36 is to also contain a packed bed of carbon as previously described. The carbon located within chamber 36 is to have previously adsorbed urea at a much lower temperature. The dialyzing fluid is conducted from chamber 36 through the first valve 22 to a heat transfer apparatus 38. Apparatus 38 is basically similar to apparatus 20 in that it is employed to effect the lowering of the temperature of the dialyzing fluid. In effect, apparatus 38 is the beginning of a second stage of dialysate concentration.

The fluid is then transmitted into a third sorbent chamber 40 through a third valve 42. The sorbent chamber 40 is to be substantially similar to the sorbent chamber 24, that is, containing a bed of activated carbon which functions to remove urea and other waste metabolites from the dialyzing fluid. The dialyzing fluid that leaves the sorbent chamber 40 is then conducted through a fourth valve 44 to a flow divider 46. The primary flow stream from the flow divider 46 is conducted back to the dialysate conduit located between the pump 18 and the artificial kidney 10. As a result, this primary flow stream is then permitted to reenter the system and again be conducted through cooler 20, first sorbent chamber 24, and so forth. The secondary flow stream from the flow divider 46 is conducted through a heat transfer apparatus 48 which is basically similar to apparatus 34. As a result, the secondary flow stream of the fluid, which is raised in temperature, is passed from the heater 48 through the fourth valve 44 into the fourth sorbent chamber 50. Again, the sorbent chamber 50 is to be basically similar to sorbent chamber 36. The dialyzing fluid is then conducted from chamber 50 through the valve 42 and then to be disposed of exteriorly of the system.

The operation of the regeneration system of this invention is as follows: For illustrative purposes, the operation of the regenerative system will be described in reference to the actual numerical values which will be encountered in a typical situation. However, it is to be understood that these numerical values can be verified and under normal conditions will actually vary depending upon the sorption characteristics of the sorbent chambers as well as the urea concentration of the blood which will steadily diminish during the treatment. The dialysate will be moved through the artificial kidney 10 by means of the pump 18. It will be assumed that the urea concentration within the dialyzing fluid after exit from the kidney 10 is 50.0 mg. percent. Also, let it be assumed that a volume of 300 milliliters per minute of the dialyzing fluid is being moved by the pump 18. Further, let it be asumed that the cooler 20 is to lower the temperature of the dialyzing fluid to approximately 30° C. and that temperature is to be maintained during conducting of the fluid through sorbent chamber 24.

Referring to FIG. 2, it can be seen that at 30° C. activated carbon has a maximum adsorbate concentration of approximately 3.8. That means that the carbon within the chamber 24 will remove urea until this maximum concentration level of 3.8 is achieved. The flow divider 28 then divides the dialyzing fluid into a primary flow of approximately 200 milliliters per minute and a secondary flow of approximately 100 milliliters per minute. Also, the urea concentration of the dialyzing fluid after exit from chamber 24 has been decreased from 50 mg. percent to 20 mg. percent. The primary flow from the flow divider 28 is then conducted to a polish sorbent chamber 30 to remove an additional amount of urea. The dialyzing fluid from the chamber 30 is then increased in temperature by temperature adjuster 32 to approximately the value of the blood temperature. The primary flow is then transmitted from the temperature adjuster back into chamber 16 of the artificial kidney 10.

The secondary flow from the flow divider 28 is elevated in temperature by means of heater 34 to approximately 60° C. This 100 milliliters per minute secondary flow stream, which is initially at 20 mg. percent urea concentration, is passed through sorbent chamber 36 through valve 26. Because the activated carbon within the chamber 36 contains a near maximum amount adsorbed of urea (for example, 3.8) again referring to FIG. 2, such carbon is capable of only adsorbing approximately a value of 2.0 grams of urea per hundred grams of carbon. As a result, because the sorbent chamber 36 is fully loaded with urea at a previously lower temperature, urea is acutally transferred from the carbon within chamber 36 into the secondary stream of dialyzing fluid passing through chamber 36. In essence, then, regeneration of the activated carbon within chamber 36 occurs. The secondary stream of dialyzing fluid is then conducted from chamber 36 through valve 22.

The purpose of the valves 22 and 26 is to effect a switching of the flow path between the chambers 24 and 36. Upon chamber 24 adsorbing near its maximum amount of urea and upon chamber 36 being regenerated a maximum amount (this ideally should occur simultaneously), valves 22 and 26 are actuated. As a result, the dialyzing fluid from pump 18 is then being conducted within chamber 36 with the secondary stream of fluid from heater 34 being conducted to within chamber 24. Thereupon, chamber 24 is being regenerated while chamber 36 functions to adsorb urea. It is to be noted that now the cool dialyzing fluid is being conducted within chamber 36, thereby permitting the activated carbon within chamber 36 to adsorb a higher percentage of urea. It is also to be noted that the elevated temperature dialyzing fluid of the secondary stream is being conducted through chamber 24, thereby permitting chamber 24 to give up urea to the secondary stream of dialyzing fluid. This switched condition exists until chamber 36 has adsorbed near the maximum amount of urea of 3.8 with the chamber 24 being regenerated near the minimum value of 2.0. The secondary stream of dialyzing fluid contains a concentration of approximately 110 mg. percent of urea. This secondary flow stream is then conducted to a second stage to effect further regeneration. The secondary stream of dialyzing fluid is conducted through a cooler 38 through a valve 42 into a third sorbent chamber 40 which is basically similar to chamber 24. The flow, after leaving chamber 40, is then conducted through a valve 44 to a flow divider 46 which then causes this flow to be broken up into a primary stream and a secondary stream. The primary stream from flow divider 46 is then connected back into the conduit between the kidney 10 and the pump 18. As a result, that portion of the dialysate is resupplied through the first stage through cooler 20 and into chamber 24 and so forth. It is to be noted that the urea concentration after passing through chamber 40 is decreased from 110 mg. percent to approximately 50 mg. percent or less. It is desired that the concentration of this primary stream be equal to or less than the urea concentration being conducted from the artificial kidney 10.

The secondary flow stream from the flow divider 46 is conducted through a heater 48, valve 44 and into a fourth sorbent chamber 50. Fourth sorbent chamber 50 is similar to chamber 36 in that it initially contains activated carbon with a high concentration of urea. It is also to be noted that chamber 40 is to be at approximately 30° C. with chamber 50 being approximately 60° C. It is also to be noted that of the 100 mililiters per minute flow being conducted to within flow divider 46, approximately 67 mililiters per minute is being conducted by the primary stream back to the conduit adjacent pump 18. Only approximately 33 mililiters per minute of dialyzing fluid is being conducted through the sorbent chamber 50. As a result of the secondary stream of fluid passing through chamber 50, the fluid has gained in urea concentration to approximately 200 mg. percent. This dialyzing solution, which is only about 10% of the amount of solution being passed through the artificial kidney 10, is then to be disposed of.

It is possible that continued refinement of this to be disposed of amount of fluid may be accomplished, if desired. If such refinement continues through a third stage regeneration system, only approximately 3% of the dialyzing fluid would be lost, and the flow rates through the various subsystems would be quite constant because water extracted from the body of the patient would be approximately equivalent to the flow leaving the third stage.

It is to be understood that appropriate metering devices wil be employed in combination with the regenerative system of this invention to inform a person as to when to actuate valves 22, 26, 42 and 44. It is further believed to be within the scope of this invention to select various flow rates through flow dividers 28 and 46. It is also to be considered within the scope of this invention to vary the temperature characteristics of the heat transfer apparatuses, 20, 38, 34 and 48. It is also to be considered a matter of choice or design as the particular type of activated carbon bed to be employed within each sorbent chamber 24, 36, 40 and 50. It is also to be considered a matter of choice or design as to the amount of activated carbon employed within each sorbent chamber.

As a result of employing the apparatus of this invention during a single treatment in which 50 to 100 gallons of dialyzing fluid is employed over a period of ten hours, only approximately five to ten gallons of that fluid wil be used. It is to be understood that the activated carbon within the sorbent chambers 24, 36, 40 and 50, as well as chamber 30, will need periodic replacement with the non-regenerated chamber 30 requiring most frequent replacement.

What is claimed is:

1. The method of regenerating the dialyzing fluid employed within an artificial kidney comprising the steps of:
    lowering the temperature of the dialyzing fluid leaving the artificial kidney to a predetermined level;
    causing the dialyzing fluid to come into contact with a first inert solid sorbent to remove waste metabolites from the fluid;
    dividing the main stream of fluid into a primary stream and a secondary stream, conducting the primary stream into the artificial kidney; and
    raising the temperature of the secondary stream to a predetermined level, causing the secondary stream to come into contact with a second inert solid sorbent to remove waste metabolites from the sorbent.

2. The method as defined in claim 1 wherein:
    lowering the temperature of the secondary stream after leaving the second inert solid sorbent;
    a third inert solid sorbent to remove waste metabolites from the fluid;
    dividing the secondary stream into a first stream and a second stream;
    conducting the first stream back through the first inert solid sorbent; and raising the temperature of the second stream to a predetermined level, causing the second stream to come into contact with a fourth inert solid sorbent to remove waste metabolites from the sorbent.

3. The method as defined in claim 2 which includes the addition step of:
disposing of the second stream.

4. The method as defined in claim 1 wherein:
selecting the volume of the secondary stream to be approximately thirty percent of the primary stream.

5. The method as defined in claim 4 wherein:
selecting the volume of the second stream to be approximately thirty percent of the first stream.

6. An apparatus for removing the waste metabolites from the dialyzing fluid of an artificial kidney comprising:
first means to lower the temperature of the main stream of dialyzing fluid being conducted from said artificial kidney;
second means to remove waste metabolites from said main stream after cooling said second means includes a sorbent;
third means to divide said main stream into a primary stream and a secondary stream, said primary stream to supply fluid into said artificial kidney;
fourth means to raise the temperature of said secondary stream; and
fifth means to transfer waste metabolites into said secondary stream, said fifth means include a sorbent.

7. The apparatus as defined in claim 6 wherein:
said second means includes a first chamber of a packed inert solid, said fifth means includes a second chamber of a packed inert solid; and
first valve means to selectively conduct said main stream of fluid to either said first chamber or said second chamber, said first valve means also selectively controlling said secondary stream of fluid from either said first chamber or said second chamber.

8. The apparatus as defined in claim 7 wherein:
second valve means to selectively conduct said main stream from either said first chamber or said second chamber to said third means, said second valve means also selectively controlling said secondary stream of fluid from said third means into either said first chamber or said second chamber.

9. The apparatus as defined in claim 8 wherein:
said first and second valve means being activated simultaneously.

10. The apparatus as defined in claim 9 wherein:
said inert solid located within said first and second chambers comprising activated carbon.

11. The apparatus as defined in claim 9 wherein:
first passage means for directing the flow of said main stream through said first chamber opposite to the direction of flow of said secondary stream through said first chamber, second passage means for directing the flow of said main stream through said second chamber opposite to the direction of flow of said secondary stream through said second chamber.

12. Apparatus as defined in claim 6 wherein:
means for maintaining said secondary stream involume approximately thirty percent of the volume of said primary stream.

13. Apparatus as defined in claim 12 wherein:
means for maintaining the difference in temperature between said main stream and said secondary stream to be approximately thirty degrees centigrade.

14. Apparatus as defined in claim 6 wherein:

sixth means to lower the temperature of said secondary stream after being conducted past said fifth means;
seventh means to remove waste metabolites from said secondary stream after cooling, said seventh means includes a sorbent;
eighth means to divide said secondary stream into a first stream and a second stream, said first stream being conducted to reenter said main stream;
ninth means to raise the temperature of said second stream; and
tenth means to transfer waste metabolites into said second stream, said tenth means includes a sorbent.

15. Apparatus as defined in claim 14 wherein:
said sixth means includes a third chamber of a packed inert solid, said tenth means includes a fourth chamber of a packed inert solid; and
third valve means to selectively conduct said secondary stream of fluid to either said third chamber or said fourth chamber, said third valve means also selectively controlling said second stream of fluid from either said first chamber or said second chamber.

16. The apparatus as defined in claim 15 wherein:
a fourth valve means to selectively conduct said secondary stream of fluid from either said third chamber or said fourth chamber to said eighth means, said fourth valve means also selectively controlling said second stream of fluid from said eighth means into either said third chamber or said fourth chamber.

17. The apparatus as defined in claim 16 wherein:
said third and fourth valve means being actuated simultaneously.

18. The apparatus as defined in claim 17 wherein:
said inert solid located within said third and fourth chamber comprising activated carbon.

19. The apparatus as defined in claim 17 wherein:
third passage means for directing the flow of said secondary stream through said third chamber opposite to the direction of flow of said second stream through said third chamber, fourth passage means for directing the flow of said secondary stream through said fourth chamber opposite to the direction of flow of said second stream through said fourth chamber.

20. Apparatus as defined in claim 14 wherein:
means for maintaining said second stream in volume 30% of the volume of said secondary stream.

21. Apparatus as defined in claim 20 wherein:
means for maintaining the difference in temperature between said secondary stream and said second stream to be approximately 30° C.

22. Apparatus as defined in claim 14 wherein:
passage means to dispose said second stream after passing through said tenth means.

References Cited
UNITED STATES PATENTS

| | | | |
|---|---|---|---|
| 3,527,700 | 9/1970 | Goldhaber | 210—22 |
| 3,506,126 | 4/1970 | Serfass et al. | 210—321 X |
| 3,463,728 | 8/1969 | Kolobow et al. | 210—22 |
| 2,963,519 | 12/1960 | Kasperik et al. | 210—34 X |
| 2,978,407 | 4/1961 | Tuttle et al. | 210—34 X |

REUBEN FRIEDMAN, Primary Examiner

R. BARNES, Assistant Examiner

U.S. Cl. X.R.
210—34, 195, 321